United States Patent [19]

Hennigan et al.

[11] Patent Number: 5,293,475
[45] Date of Patent: Mar. 8, 1994

[54] ELECTRONIC YEARBOOK PUBLICATION SYSTEM

[75] Inventors: Edward L. Hennigan, Plano; Christopher M. Wiencek, Dallas; Deborah Evans, Irving, all of Tex.

[73] Assignee: Taylor Publishing Company, Dallas, Tex.

[21] Appl. No.: 795,198

[22] Filed: Nov. 18, 1991

[51] Int. Cl.⁵ .................................... G06F 15/62
[52] U.S. Cl. ................................ 395/148; 395/155; 358/451
[58] Field of Search ............... 395/143, 146, 147, 148, 395/155, 161; 358/450, 461, 486, 459, 451, 77, 287, 75, 296, 280; 382/47

[56] References Cited

U.S. PATENT DOCUMENTS

| | | | |
|---|---|---|---|
| 4,034,400 | 7/1977 | Owen et al. | 358/75 |
| 4,366,508 | 12/1982 | Crean et al. | 358/287 |
| 4,673,989 | 6/1987 | Yamada et al. | 358/287 |
| 4,679,095 | 7/1987 | Kitamura et al. | 358/280 |
| 4,775,886 | 10/1988 | Hirosawa | 358/77 |
| 4,949,188 | 8/1990 | Sato | 358/448 |
| 4,951,132 | 8/1990 | Nakade et al. | 358/524 |
| 5,101,282 | 3/1992 | Honma | 358/451 |
| 5,161,029 | 11/1992 | Yamanishi | 358/296 |
| 5,170,467 | 12/1992 | Kubota et al. | 395/148 |

*Primary Examiner*—Heather R. Herndon
*Attorney, Agent, or Firm*—Baker & Botts

[57] ABSTRACT

A system for publishing a yearbook including scanning circuitry for generating digital images from photographs. Imaging processing circuitry for processing the digital images, storage circuitry coupled to the image processing circuitry for storing the processed digital images and publishing circuitry for generating text, graphics. Page layouts define regions where the processed digital images are to be placed prior to receiving the photographs and for retrieving the stored digital images and placing the image responsive to the page layouts.

29 Claims, 1 Drawing Sheet

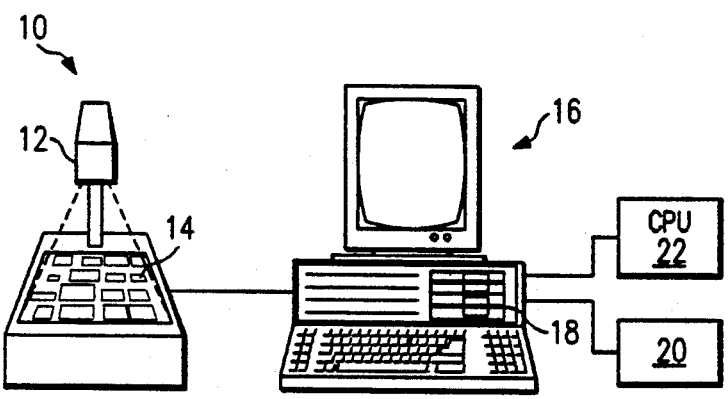
FIG. 1a
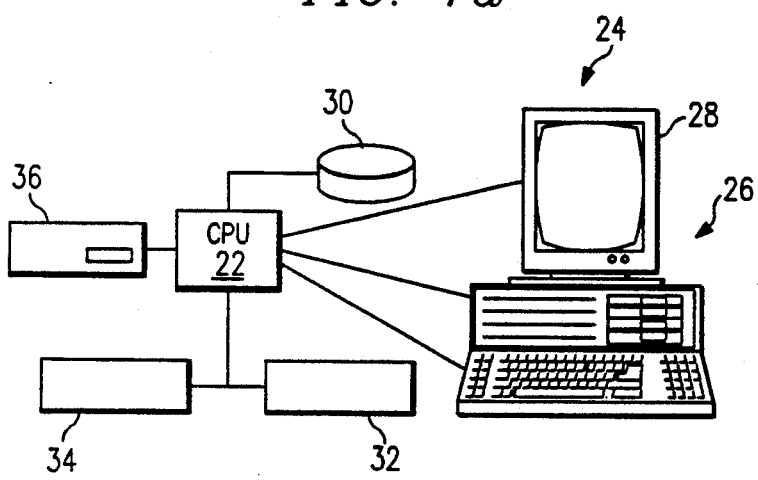
FIG. 1b
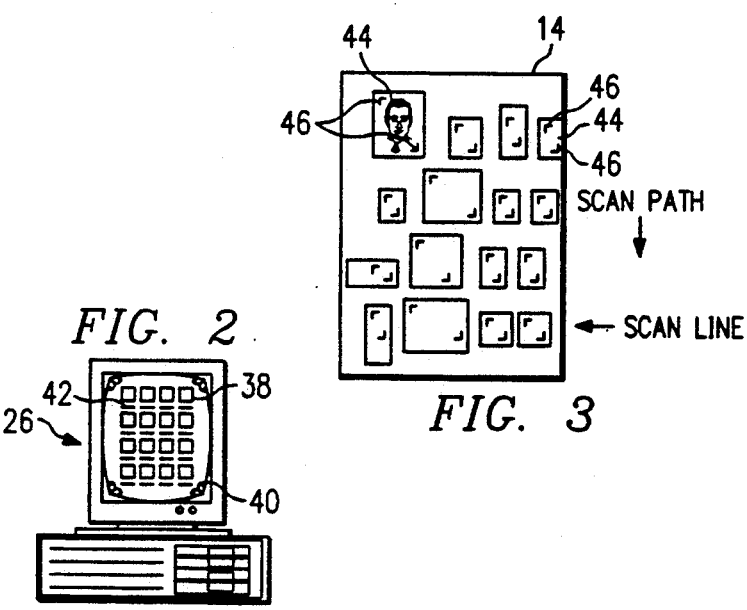
FIG. 2
FIG. 3
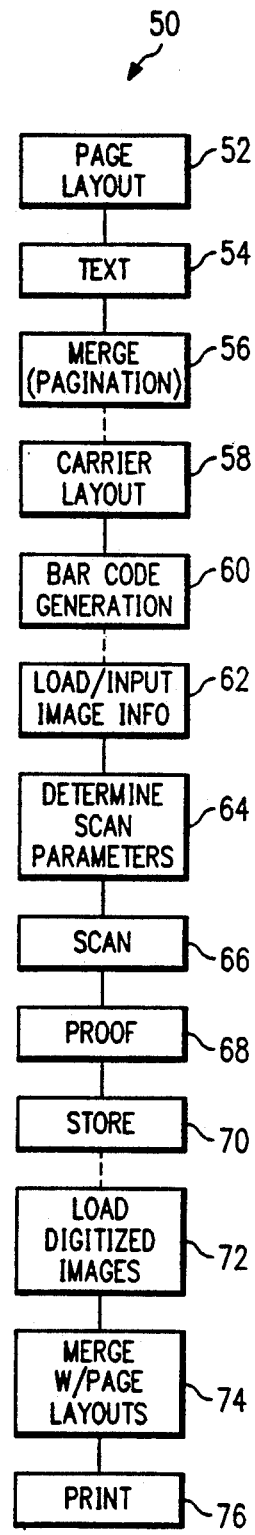
FIG. 4

ELECTRONIC YEARBOOK PUBLICATION SYSTEM

TECHNICAL FIELD OF THE INVENTION

This invention applies in general to publishing, and more particularly to a system for electronically publishing a yearbook.

BACKGROUND OF THE INVENTION

Each year, virtually all secondary schools and universities prepare yearbooks memorializing the school year's events. These yearbooks contain text, graphics and photographs. The text, graphics and photographs are generated throughout the school year; however, the entirety of information is not available until the end of the school year.

Because most schools have approximately the same end-of-year schedule, the yearbook publisher receives the final release of information for many schools on the same date. Since it is desirable to publish the yearbooks prior to the ensuing summer's end, the burden placed on the publisher during the spring months is extreme.

Heretofore, the production of yearbooks has been highly labor intensive. Photographs submitted to the publisher must be re-photographed to the correct size for the space allocated on the page. The final photographs are pasted onto the page layouts by hand. The text must be carefully set to provide the correct spaces for the photographs and graphics to add later.

Therefore, a need has arisen in the industry for an efficient system for producing yearbooks.

SUMMARY OF THE INVENTION

In accordance with the present invention, a method and apparatus is provided which substantially eliminates problems associated with prior art yearbook publication systems.

In one aspect of the present invention, a system for publishing yearbooks comprises scanning circuitry for generating digital images from photographs, image processing circuitry for processing the digital images, and storage circuitry coupled to the image processing circuitry for storing the processed digital images. Publishing circuitry is provided for generating text, graphics and page layouts defining regions where the processed digital images are to be placed prior to receiving the photographs and for retrieving the stored digital images and placing the images responsive to the page layouts.

In another aspect of the invention, the scan rate of the scanning circuitry may be varied responsive to the size of the photographs being scanned and the size of the defined regions associated with the photographs on the page layouts.

The present invention provides several advantages over the prior art. Since the images are stored electronically, the labor involved in applying the images to the yearbook pages is greatly reduced. Page layouts may be generated long before the photographs are received. The images may be scaled electronically during the scanning process to eliminate the need for reproducing the photographs in the correct size. Thus, the yearbooks may be produced more quickly and at a reduced cost.

BRIEF DESCRIPTION OF THE DRAWINGS

For a more complete understanding of the present invention, and the advantages thereof, reference is now made to the following description taken in conjunction with the accompanying drawings, in which:

FIG. 1a illustrates the preferred embodiment of the scanning subsystem of the present invention;

FIG. 1b illustrates the preferred embodiment of the page layout subsystem of the present invention;

FIG. 2 illustrates a page layout workstation showing a page layout screen;

FIG. 3 illustrates the carrier for the photographs for use in the scanning subsystem of FIG. 1a; and FIG. 4 illustrates a flow chart detailing the operation of the publishing system.

DETAILED DESCRIPTION OF THE INVENTION

The preferred embodiment of the present invention and its advantages are best understood by referring to FIGS. 1-4 of the drawings, like numerals being used for like and corresponding parts of the various drawings.

FIG. 1a illustrates a preferred embodiment of the scanning subsystem of the present invention. The scanning subsystem indicated generally at 10 comprises a flatbed scanner 12 upon which a carrier 14 is placed, the carrier 14 holding the photograph to be scanned. The flatbed scanner 12 is coupled to a scanning workstation 16 having a removable storage device 18, such as a magnetic tape backup unit, removable hard disk, a WORM (Write Once, Read Many) drive, or other high density storage device. The scanning workstation 16 is coupled to a printing device 20, such as a laser printer, and to the host CPU 22, which is typically a mainframe computer, such as a VAX mainframe manufactured by Digital Equipment Corporation of Boston, Mass.

In the preferred embodiment, the flatbed scanner 12 may be either a black/white or color scanner, and should be able to accommodate a carrier which holds a plurality of photographs such that several photographs are scanned simultaneously. The scanning workstation 16 may generally comprise a personal computer, such as the IBM PC line of computers, or a suitable compatible computer. The scanning workstation 16 controls operation of the scanner 12 and performs image processing on the scanned images, as described in greater detail in connection with FIG. 4. The scanning workstation 16 controls the scanner 12 and performs the imaging processing pursuant to parameters received from the host CPU 22 which has access to the page layouts associated with the photographs being scanned.

FIG. 1b illustrates a page layout subsystem 24. The CPU 22 is coupled to a plurality of workstations 26 (only one shown) each including a full page monitor 28, a high capacity storage device 30, a proof printing device 32 and a final printing device 34. A second storage device 36, compatible with the output from storage medium 18, is coupled to the CPU 22 in order to transfer the images generated by the scanning substation 10.

In the preferred embodiment, the proof and final printers 32 and 34 are laser printers capable of generating half-tone images. The high capacity storage device 30 may be a hard disk drive. The workstations 26 may be IBM-compatible computers. It is desirable that the monitor 28 be able to display an entire page layout in order to facilitate accurate reproduction of the pages.

FIG. 2 illustrates a workstation 26 showing a page layout. A page layout may include a plurality of defined photograph areas 38, graphics 40 and text 42. The graphics and text may be completed and the defined photograph areas 38 may be generated to provide areas in which the images from the scanning subsystem are to be placed. In the vast majority of cases, the page layouts may be generated well before the photographs are received from the school. The page layouts are stored on the high capacity storage device 30, since the data may be compressed into relatively small files, as opposed to the digital images generated by the scanning system which require a large storage area, even when compressed.

FIG. 3 illustrates a carrier for use with the flatbed scanner 12. The carrier 14 holds a plurality of photographs 44 having crop-points 46. The crop-points 46 are typically placed on the photographs 44 at the school to maintain the correct aspect ratio using a device such as the TECHNICROPPER, available from Taylor Publishing, Inc. of Dallas, Tex. However, as can be seen in FIG. 3, the size of the cropped portion of the photographs 44 may vary, even though the defined photograph areas corresponding to the photographs are the same size.

In an important aspect of the invention, the images are properly scaled during the scanning process. In the preferred embodiment, the photographs in the yearbook will have a resolution of 133 half-tone dots per inch. To provide the resolution of 133 half-tone dots per inch, a scan rate of 188 samples per inch ($133\sqrt{2}$) is used. For a photograph which is the same size as the defined area on the page layout, therefore, a scan rate of 188 samples per inch is desired. If the picture has a width and height which are 200% of the respective dimensions defined for the photograph area, a scan rate of 94 samples per inch may be used. If the photograph has a height and width which are 50% of the height and width of the respective defined photograph area, then a scan rate of 376 is used.

The scanner scans samples in a line (the "scan line") transverse to the path of scanner as it proceeds down the carrier. If the photographs across a scan line have different desired scan rates, the highest scan rate is used for all the photographs in the line. This results in some photographs being scanned at a higher scan rate than is necessary to provide the 133 half-tone dots per inch which is desired. During the scanning process, these unnecessary samples are discarded.

For example, if three photographs 44 appeared on a single line, one at 100% (188 samples per inch), one at 200% (94 samples per inch) and one at 50% (376 samples per inch), then all photographs in the line would be scanned at 376 samples per inch. For the 50% photograph, all 376 samples per inch would be stored in an image corresponding to that photograph. For the 100% photograph, every other sample in the line would be discarded (and every other line discarded) such that the total stored samples for the 100% and 50% photographs would be the same. Similarly, for the 200% photograph, one out of every four samples in a line would be retained.

Also, scanned data outside of the cropped portion of the photograph 44 is also discarded. This greatly reduces the size of the stored digital images.

In the preferred embodiment, the photographs are also processed to equalize the tone scale of each image. The tone scale compensation for each photograph may be determined electronically, or by a skilled operator.

After processing the digital images, a proof is output from the laser printer 20 to ensure the validity of the stored images. After proofing the images, the image data is stored on the removable media of the storage device 18. Each yearbook will have its own set of one or more of the removable media.

FIG. 4 illustrates a flow chart describing operation of the electronic publishing system. In block 52, the layout of the pages is defined using the page layout subsystem 24. In block 54, the text for insertion onto the pages is entered into the page layout subsystem 24. In block 56, the page layouts and text are merged; this step is also known as "pagination".

In block 58, the layout of the carrier sheets is defined. Each carrier sheet is uniquely identified, and the position of the crop points associated with the photographs is entered for each carrier sheet. Additionally, other information is entered for each photograph including whether the photograph is black/white or color, and whether the finish is matte or glossy. Each picture on the carrier sheet is related to an area defined during the page layout step 52. After inputting the data for a carrier sheet, a bar code label, or other identifying means, is generated and adhered to the carrier sheet. As denoted by the dashed lines, the steps described in connection with blocks 58 and 60 need not be carried out immediately after the previous steps, but may be performed at a much later time.

In block 62, the scanning subsystem is set up for scanning by loading the carrier information. The bar code associated with the carrier is read and data pertaining to the photographs is loaded from the host CPU 22. From the carrier information, a scan rate is determined in block 64. In block 66, the photographs are scanned to generate digital images. The digital images are sent to the printer 20 in block 68 and, in block 70, are stored onto the storage device 18 for later retrieval.

In block 72, the images are retrieved, and then merged with the page layouts in block 74. When a page is complete, it is printed (block 76) in the proof printer 32, followed by a final print in the high resolution printer 34.

When all data have been received for the yearbook, or when all data for certain pages of the yearbook have been received, the respective images are loaded into the CPU 22 via the storage device 36 and are placed in the page layouts by the operators of the workstations 26. The page layouts are retrieved from storage device 30. The final pages are proofed using proof printer 32 and then printed in final form using final printer 34. The final pages are stored until all pages are complete, at which time they are reproduced and bound to generate the final yearbooks.

Although the present invention and its advantages have been described in detail, it should be understood that various changes, substitutions and alterations can be made herein without departing from the spirit and scope of the invention as defined by the appended claims.

We claim:

1. A system for publishing yearbooks, including text, graphics, and images, comprising:
    scanning circuitry for generating digital images from photographs;
    image processing circuitry for processing the digital images, said image processing circuitry operable to enhance the quality of the images;
    storage circuitry coupled to the image processing circuitry for storing the processed digital images;
    publishing circuitry for generating page layouts, including text and graphics and further including defined regions where the processed digital images are to be subsequently placed; and circuitry for sizing the stored digital images to fit the defined regions in the page layouts, and for placing the sized digital images in said defined regions.

2. The system of claim 1 wherein said scanning circuitry comprises circuitry for scanning images at a plurality of scan rates and circuitry for changing scan rates during operation.

3. The system of claim 2 wherein said image processing circuitry programmably selects the scan rate.

4. The system of claim 3 wherein said image processing circuitry is operable to select the scan rate responsive to desired magnification levels associated with the photographs, said desired magnification levels being calculated by comparing the size of the photographs being scanned to the size of the defined regions associated with the photographs.

5. The system of claim 1 wherein said image processing circuitry is operable to store defined portions of the generated images.

6. The system of claim 5 wherein said image processing circuitry is operable to store defined portions of the generated images responsive to crop points associated with the generated images.

7. The system of claim 1 wherein said image processing circuitry includes circuitry to modify the tone scale of a generated image.

8. The system of claim 1 and further including print circuitry for outputting a hardcopy of said processed digital images prior to storing said processed digital images.

9. The yearbook publishing system of claim 1 wherein said system comprises print circuitry for outputting a hard copy of the yearbook pages, including text, graphics, and images, in the desired layout.

10. Apparatus for generating digital images from photographs for use in printing yearbook pages, comprising:

a carrier for holding an array of photographs on said scanner, such that photographs of different sizes may be scanned;

circuitry for determining a scan rate responsive to the desired magnification level of the photographs, said desired magnification level based on the sizes of the photographs to be scanned compared to the size of the yearbook page regions associated with the photographs;

circuitry for storing data related to the size of the photographs and the scan rate for the photographs; and a scanner responsive to said determining circuitry for digitally scanning the photographs.

11. The apparatus of claim 10 and further comprising circuitry for inputting the location of the photographs on said carrier.

12. The apparatus of claim 10 wherein said determining circuitry comprises circuitry for determining a maximum scan rate that is substantially equal to the greatest of the scan rates associated with each of a plurality of photographs being simultaneously scanned.

13. The apparatus of claim 10 and wherein said determining circuitry further comprises circuitry for receiving page layout information associated with respective photographs.

14. The apparatus of claim 10 wherein said storing circuitry comprises circuitry for selectively storing information from said scanner, such that white space and unnecessary image samples may be selectively omitted from storage.

15. The apparatus of claim 14 wherein said storing circuitry comprises circuitry for selectively storing information from said scanner responsive to crop points associated with said photographs.

16. The apparatus of claim 10 wherein said carrier is configured so that a plurality of the photographs are scanned simultaneously.

17. A method of electronically publishing a book, including text, graphics and photographs comprising the steps of:

generating digital images from photographs at a plurality of scan rates;

processing the digital images;

generating text, graphics and page layouts defining regions where the processed digital images are to be placed prior to receiving said photographs; and retrieving the stored digital images and placing the images responsive to the page layouts.

18. The method of claim 17 wherein said scanning step comprises the step of programmably scanning the images at a plurality of scan rates.

19. The method of claim 17 and further comprising the step of storing the generated digital images.

20. The method of claim 19 wherein said storing step comprises the step of storing portions of the generated digital images responsive to crop points associated with the photographs.

21. The method of claim 17 wherein said processing step includes the step of adjusting the tone scale of a generated image.

22. A method of generating digital images comprising the steps of:

determining a scan rate responsive to a desired magnification level, said desired magnification level being based on the respective sizes of a plurality of photographs and the desired sizes of associated images thereof; and scanning said plurality of photographs at said determined scan rate.

23. The method of claim 22 and further comprising the step of processing the generated images.

24. The method of claim 22 wherein said determining step comprises the step of determining a maximum scan rate based on the relative sizes of the photographs and the associated images, said maximum scan rate being substantially equal to the greatest of the scan rates associated with each of said plurality of photographs to be scanned.

25. The method of claim 24 and further comprising the step of receiving page layout information defining the desired sizes of the images.

26. The method of claim 22 and further comprising the step of storing image data.

27. The method of claim 26 wherein said storing step comprises the step of selectively storing image data, such that white space and unnecessary image samples may be selectively omitted from storage.

28. The method of claim 27 wherein said selectively storing step comprises selectively storing image data responsive to crop points associated with said photographs.

29. The method of claim 22 wherein said scanning step comprises the step of scanning a plurality of the photographs simultaneously.

* * * * *

UNITED STATES PATENT AND TRADEMARK OFFICE
CERTIFICATE OF CORRECTION

PATENT NO. : 5,293,475
DATED : March 8, 1994
INVENTOR(S) : Hennigan et al.

It is certified that error appears in the above-identified patent and that said Letters Patent is hereby corrected as shown below:

On the cover page [75], please correct the third inventor's name to read as follows: Deborah K. Evans.

On the cover page [57] in the Abstract, please correct as follows:

Line 7, after "layouts", delete "define" and insert --defining--.

Signed and Sealed this

Eleventh Day of October, 1994

Attest:

BRUCE LEHMAN

*Attesting Officer*  *Commissioner of Patents and Trademarks*